(12) United States Patent
Coscarella

(10) Patent No.: US 8,113,241 B2
(45) Date of Patent: Feb. 14, 2012

(54) RESILIENT TEST VALVE MEMBER

(76) Inventor: Gabe Coscarella, Edmonton (CA)

( * ) Notice: Subject to any disclaimer, the term of this patent is extended or adjusted under 35 U.S.C. 154(b) by 896 days.

(21) Appl. No.: 12/112,307

(22) Filed: Apr. 30, 2008

(65) Prior Publication Data
US 2009/0272930 A1 Nov. 5, 2009

(51) Int. Cl.
*F16L 55/10* (2006.01)
(52) U.S. Cl. .............. 138/89; 138/94; 251/326
(58) Field of Classification Search .......... 138/89, 138/94; 251/4, 326, 85
See application file for complete search history.

(56) References Cited

U.S. PATENT DOCUMENTS

| 716,641 | A | * | 12/1902 | Leech | 138/94 |
|---|---|---|---|---|---|
| 940,458 | A | * | 11/1909 | Goodman | 138/94 |
| 1,627,502 | A | * | 5/1927 | Goodman | 138/94 |
| 1,887,542 | A | * | 11/1932 | Carr | 138/94 |
| 2,373,242 | A | * | 4/1945 | Glashow | 138/89 |
| 2,812,778 | A | * | 11/1957 | Ver Nooy | 138/94 |
| 3,154,106 | A | | 10/1964 | Ver Nooy | 138/94 |
| 3,442,295 | A | * | 5/1969 | Ver Nooy | 138/94 |
| 3,687,166 | A | * | 8/1972 | Herrin | 138/94 |
| 3,769,673 | A | | 11/1973 | Siepmann | 29/890.132 |
| 4,040,450 | A | | 8/1977 | Boundy | 138/94 |
| 4,111,391 | A | | 9/1978 | Pilolla | 251/5 |
| 4,858,883 | A | | 8/1989 | Webster | 251/61.1 |
| 5,082,026 | A | * | 1/1992 | Smith | 138/94 |
| 5,163,480 | A | | 11/1992 | Huber | 138/94 |
| 5,287,730 | A | | 2/1994 | Condon | 73/49.8 |
| 5,496,006 | A | | 3/1996 | Kulka | 248/231.9 |
| 5,535,983 | A | | 7/1996 | Hohermuth | 251/5 |
| 5,549,134 | A | | 8/1996 | Browne | 137/606 |
| 5,657,961 | A | | 8/1997 | Kalsi | 251/326 |
| 5,660,370 | A | | 8/1997 | Webster | 251/129.17 |
| 5,826,609 | A | | 10/1998 | Watts | 137/15.17 |
| 6,029,684 | A | | 2/2000 | Watts | 137/15.19 |
| 6,062,262 | A | | 5/2000 | Tash | 138/89 |

(Continued)

FOREIGN PATENT DOCUMENTS

CA 2339462 A1 9/2002

(Continued)

OTHER PUBLICATIONS

"An Easier and Faster Way to Test Sewer Lines from RectorSeal®" news release, <http://www.rectorseal.com/presrel/releases/hubset.htm> [available at least as early as Dec. 2001], 2 pages.

*Primary Examiner* — Patrick F Brinson
(74) *Attorney, Agent, or Firm* — Christensen O'Connor Johnson Kindness PLLC

(57) ABSTRACT

A method and apparatus for pressure testing a plumbing system, includes a resilient body having a body diameter. The resilient body is adapted to elastically deform by when passing through a service opening that is smaller than the body diameter and then resiliently return to the body diameter. A sealing surface is carried by the resilient body. A rigid coupling is positioned on the resilient body. The rigid coupling is adapted for coupling the resilient body to a shaft, such that the shaft is able to manipulate movement of the resilient body. The resilient body is inserted into a service opening of a plumbing system to be pressure tested. The resilient body flexes while being inserted and then resiliently returns to the body diameter with the sealing surface performing a sealing function.

5 Claims, 3 Drawing Sheets

U.S. PATENT DOCUMENTS

| | | | |
|---|---|---|---|
| 6,125,878 A | 10/2000 | Watts | 137/315.41 |
| 6,289,935 B1 | 9/2001 | Tash | 138/97 |
| 6,338,469 B1 | 1/2002 | Kalsi | 251/326 |
| 6,564,823 B1 | 5/2003 | Mankins | 137/318 |
| 6,655,413 B2 | 12/2003 | Condon | 138/94.3 |
| 6,679,283 B1 | 1/2004 | Coscarella | 137/315.41 |
| 6,923,421 B2 | 8/2005 | Raftis | 251/4 |
| 6,948,696 B1 | 9/2005 | Aanonsen | 251/4 |
| 6,959,908 B2 | 11/2005 | Isbitsky | 251/85 |
| 6,997,041 B1 | 2/2006 | Metzger | 73/37 |
| 2005/0067441 A1 | 3/2005 | Alley | 222/547 |

FOREIGN PATENT DOCUMENTS

| | | |
|---|---|---|
| CA | 2380194 A1 | 10/2002 |
| CA | 2501800 A1 | 9/2006 |

* cited by examiner

FLOW

RESILIENT TEST VALVE MEMBER

FIELD

The present application relates to a valve member used in plumbing test systems.

BACKGROUND

Canadian patent application no. 2,501,800 discloses an apparatus for testing a plumbing system.

SUMMARY

According to one aspect there is provided a valve member for pressure testing a plumbing system, which includes a resilient body having a body diameter. The resilient body is adapted to elastically deform by when passing through a service opening that is smaller than the body diameter and then resiliently return to the body diameter. A sealing surface is carried by the resilient body. A rigid coupling is positioned on the resilient body. The rigid coupling is adapted for coupling the resilient body to a shaft, such that the shaft is able to manipulate movement of the resilient body.

According to another aspect there is provided a method of pressure testing a plumbing system. A valve member is provided, as described above. The valve member is inserted into a service opening of a plumbing system to be pressure tested. The service opening has a diameter that is smaller than the body diameter of the resilient body. The resilient body flexes while being inserted and then resiliently returns to the body diameter with the sealing surface sealing a pipe.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
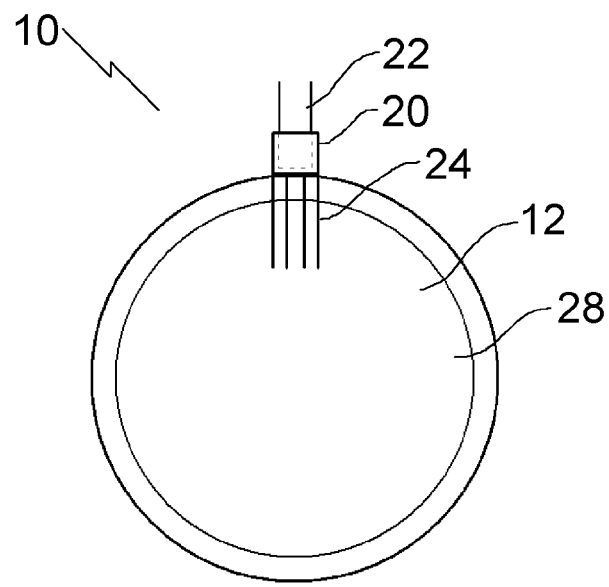
FIG. 1 is a rear plan view of the valve member.

A valve member for pressure testing a plumbing system generally identified by reference numeral 10, will now be described with reference to FIG. 1 through 4. Valve member 10 in combination with a housing, generally identified by reference numeral 100, will be described with reference to FIGS. 5 and 6.

Figure 2:
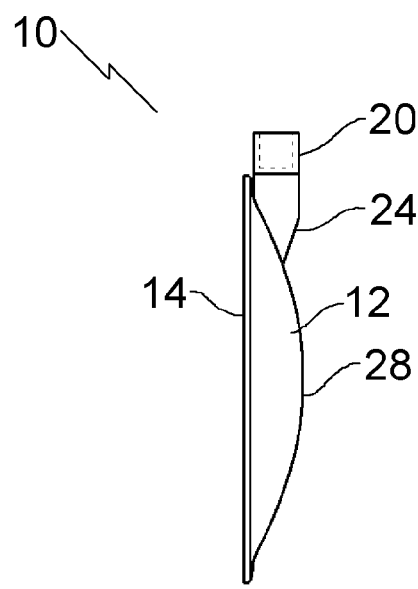
FIG. 2 is a side plan view of the valve member.
Figure 3:
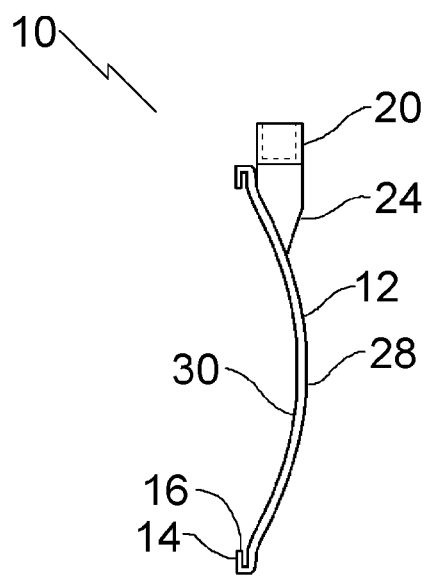
FIG. 3 is a side plan view in section of the valve member with an alternative sealing surface.
Figure 4:
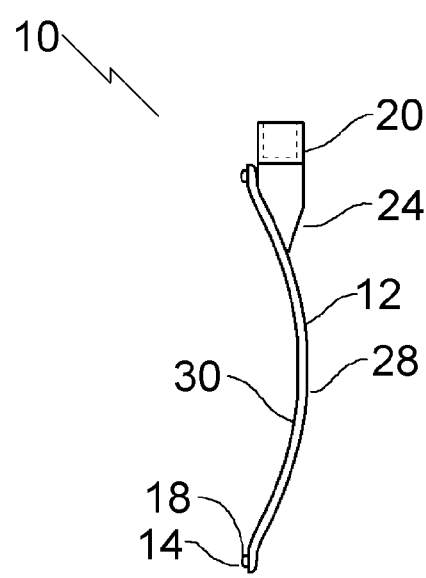
FIG. 4 is a side plan view in section of the valve member with another alternative sealing surface.
Figure 5:
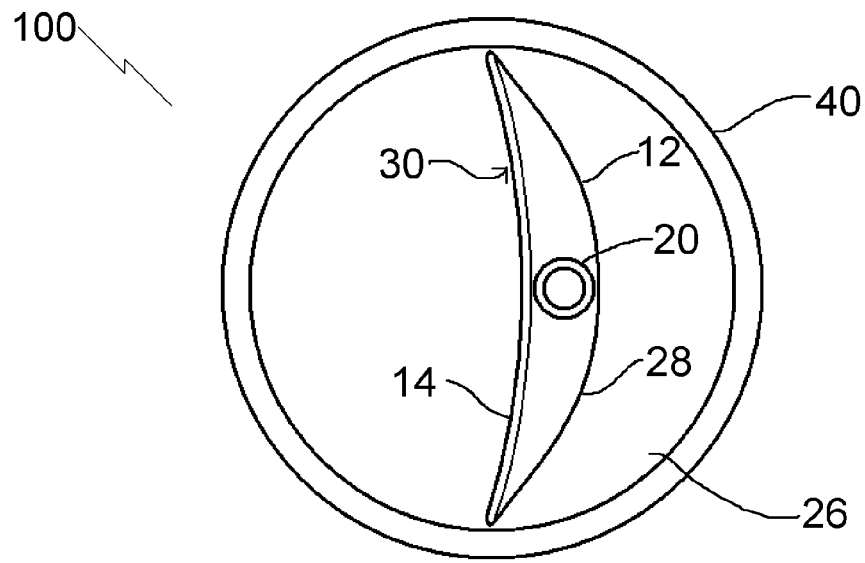
FIG. 5 is a top view of the valve member being inserted through a service opening.
Figure 6:
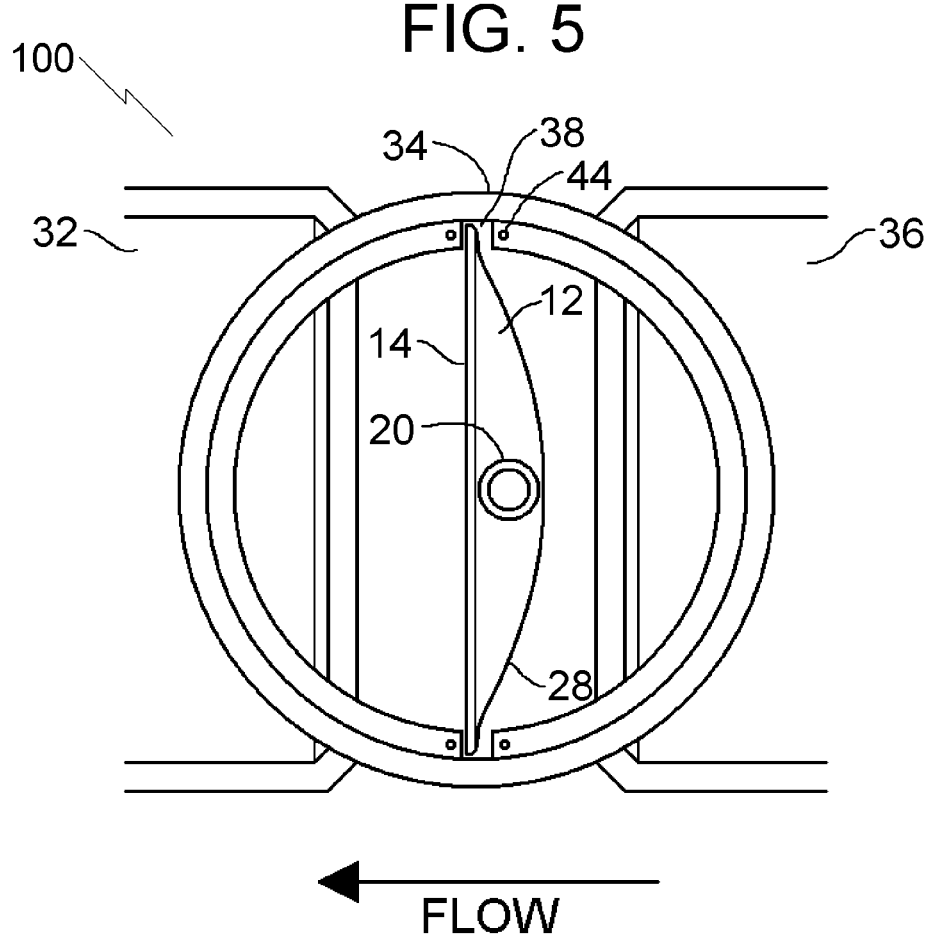
FIG. 6 is a top view in section of the valve member installed in a housing.

Structure and Relationship of Parts:

Referring to FIG. 2, valve member 10 includes a resilient body 12, and a sealing surface 14 carried by resilient body 12. Alternative sealing surfaces may include, referring to FIG. 3, a ledge with a gasket 16, or, referring to FIG. 4, an embedded o-ring 18. Referring to FIG. 1, a rigid coupling 20 on resilient body 12 allows resilient body 12 to be coupled to a shaft 22, such that shaft 22 is able to manipulate movement of resilient body 12. Rigid coupling 20 includes rigid vanes 24 to ensure a proper connection between coupling 20 and body 12. Referring to FIG. 5, resilient body 12 is adapted to elastically deform when passing through a service opening 26 that is smaller than the diameter of resilient body 12, and resiliently return to the body diameter in a non-confining space, as shown in FIG. 6. Referring to FIG. 3, resilient body 12 has a convex first face 28 and a concave second face 30, such that resilient body 12 deforms through a compression of the concave second face 30 and a stretching of the convex first face 28. Referring to FIG. 6, convex first face 28 and concave second face 30 also provides structural support to resilient body 12 when sealing against a surface, such as the outlet 32 within a housing 34, where resilient body 12 is installed such that fluid pressure builds from the inlet 36 against convex first face 28.

Figure 7:
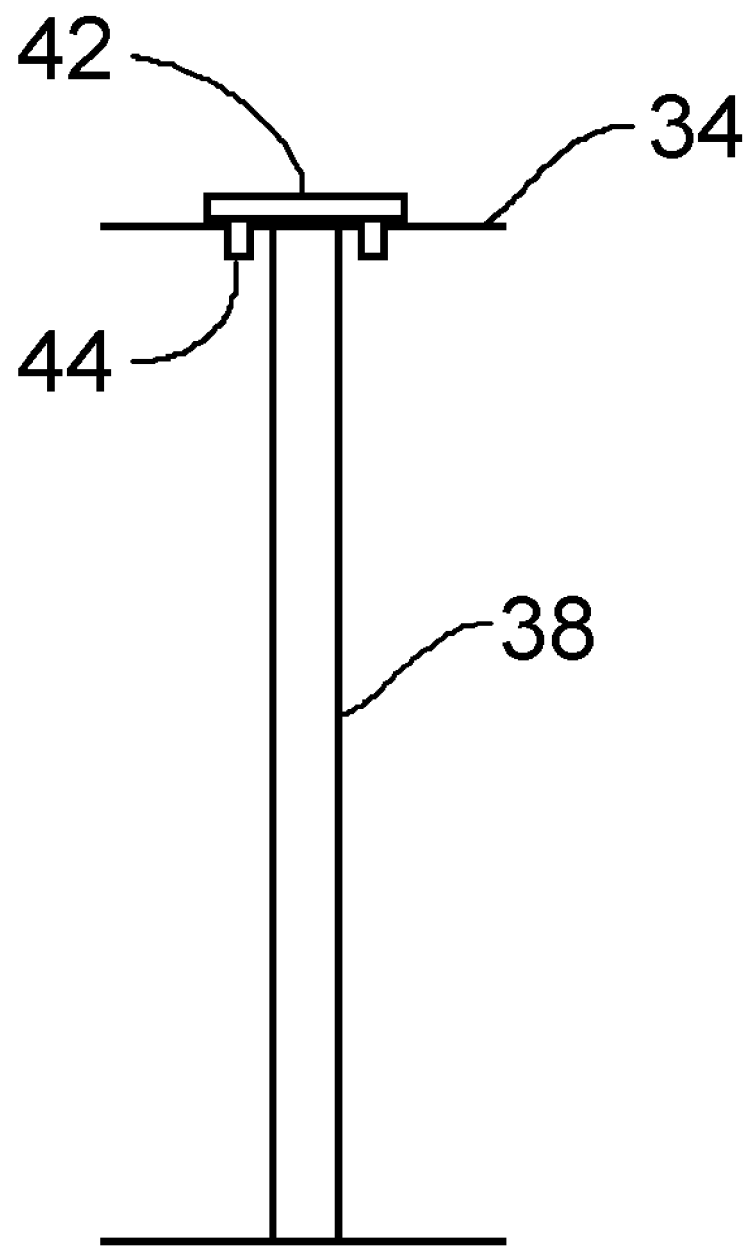
FIG. 7 is a detailed side view in section of the housing.

Operation:

Referring to FIG. 1 through 4, valve member 10 is provided as described above. Referring to FIGS. 5 and 6, valve member 10 in combination with housing 34 is provided as described above, and generally indicated by reference numeral 100. Referring to FIG. 1, shaft 22 is connected to rigid coupling 20 to allow body 12 to be manipulated by shaft 22. Referring to FIG. 5, valve member 10 is then inserted into service opening 26 of a plumbing system to be pressure tested. If service opening 26 has a diameter that is smaller than the body diameter of resilient body 12, resilient body 12 will flex while being inserted, and then resiliently returns to the body diameter as shown in FIG. 6 with sealing surface 14 sealing a pipe, or outlet 32 as shown. As shown, a slot 38 in housing 34 allows resilient body 12 to return to the body diameter. Referring to FIG. 7, to prevent glue from entering slot 38 when e.g. a riser pipe 40 with service opening 26 (shown in FIG. 5) is being attached to housing 34, a cap 42 is installed above slot 38. Cap 42 is shown to be inserted into holes 44. Once valve member 10 is correctly positioned, shaft 22 may be decoupled to allow service opening 26 to be sealed. Flow may then be introduced through inlet 36, such that pressure builds against convex first face 28, causing sealing surface 14 to create a seal, and allowing the plumbing system to be tested. After testing, shaft 22 is recoupled to rigid coupling 20 and resilient body 12 may be removed using shaft 22.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope defined in the Claims.

What is claimed is:

1. A valve member for pressure testing a plumbing system, comprising:

a resilient body having a body diameter, the resilient body being adapted to elastically deform when passing through a service opening that is smaller than the body diameter and then resiliently return to the body diameter, the resilient body having a convex first face and a concave second face, the resilient body deforming through a compression of the concave second face and a stretching of the convex first face;

a sealing surface carried by the resilient body; and a rigid coupling on the resilient body, the rigid coupling being adapted for coupling the resilient body to a shaft, such that the shaft is able to manipulate movement of the resilient body.

2. A valve member for pressure testing a plumbing system, comprising in combination:
- a housing having an inlet, an outlet and a service opening having a diameter, the housing having an internal sealing surface;
- a resilient body having a body diameter that is smaller than the service opening diameter, the resilient body being adapted to elastically deform when passing through the service opening and then resiliently return, the resilient body having a convex first face and a concave second face, the resilient body deforming through a compression of the concave second face and a stretching of the convex first face;
- a sealing surface carried by the resilient body which is adapted to engage the internal sealing surface of the housing; and
- a rigid coupling on the resilient body, the rigid coupling being adapted for coupling the resilient body to a shaft, such that the shaft is able to manipulate movement of the resilient body to bring the sealing surface of the resilient body into engagement with the internal sealing surface of the housing.

3. A method of pressure testing a plumbing system, the method comprising:
- providing a valve member, the valve member comprising:
  - a resilient body having a body diameter, the resilient body being adapted to elastically deform when passing through a service opening that is smaller than the body diameter and then resiliently return to the body diameter, the resilient body having a convex first face and a concave second face, the resilient body deforming through a compression of the concave second face and a stretching of the convex first face;
  - a sealing surface carried by the resilient body; and
  - a rigid coupling on the resilient body, the rigid coupling being adapted for coupling the resilient body to a shaft, such that the shaft is able to manipulate movement of the resilient body;
- connecting the coupling to a shaft; and
- inserting the valve member into a service opening of a plumbing system to be pressure tested, the service opening having a diameter that is smaller than the body diameter of the resilient body, such that the resilient body flexes while being inserted and then resiliently returns to the body diameter with the sealing surface sealing a pipe.

4. A method of pressure testing a plumbing system, the method comprising:
- providing a valve member, the valve member comprising:
  - a resilient body having a body diameter, the resilient body being adapted to elastically deform when passing through a service opening that is smaller than the body diameter and then resiliently return to the body diameter;
  - a sealing surface carried by the resilient body; and
  - a rigid coupling on the resilient body, the rigid coupling being adapted for coupling the resilient body to a shaft, such that the shaft is able to manipulate movement of the resilient body;
- connecting the coupling to a shaft; and
- inserting the valve member into a service opening of a plumbing system to be pressure tested, the service opening having a diameter that is smaller than the body diameter of the resilient body, such that the resilient body flexes while being inserted and then resiliently returns to the body diameter with the sealing surface sealing a pipe; and
- decoupling the rigid coupling and the shaft after inserting the valve member.

5. The method of claim 4, further comprising coupling the shaft to the rigid coupling and removing the valve member.

\* \* \* \* \*